United States Patent
Elad et al.

(10) Patent No.: US 10,798,757 B2
(45) Date of Patent: Oct. 6, 2020

(54) SYSTEMS, METHODS, AND COMPUTER PROGRAM PRODUCTS FOR TOKEN-BASED SESSION SETUP IN TELECOMMUNICATION SERVICES

(71) Applicant: Genband US LLC, Plano, TX (US)

(72) Inventors: Asi Elad, Kiryat Onno (IL);
Jean-Francois Morin, Audet (CA)

(73) Assignee: Ribbon Communications Operating Company, Inc., Westford, MA (US)

( * ) Notice: Subject to any disclaimer, the term of this patent is extended or adjusted under 35 U.S.C. 154(b) by 514 days.

(21) Appl. No.: 15/389,740

(22) Filed: Dec. 23, 2016

(65) Prior Publication Data

US 2017/0196031 A1    Jul. 6, 2017

Related U.S. Application Data

(60) Provisional application No. 62/273,886, filed on Dec. 31, 2015.

(51) Int. Cl.
| | |
|---|---|
| *H04W 76/11* | (2018.01) |
| *H04L 29/08* | (2006.01) |
| *H04L 29/06* | (2006.01) |
| *H04M 15/10* | (2006.01) |

(52) U.S. Cl.
CPC ......... *H04W 76/11* (2018.02); *H04L 63/0428* (2013.01); *H04L 63/0807* (2013.01); *H04L 65/1069* (2013.01); *H04L 67/02* (2013.01); *H04M 15/10* (2013.01); *H04L 65/1006* (2013.01); *H04L 2463/121* (2013.01)

(58) Field of Classification Search
CPC ..... H04W 76/11; H04W 4/24; H04L 63/0807; H04L 67/02; H04L 65/1069; H04L 63/0428; H04L 65/1006; H04L 2463/121; H04M 15/10; H04M 15/8228; H04M 15/09; H04M 15/08
See application file for complete search history.

(56) References Cited

U.S. PATENT DOCUMENTS

| | | | |
|---|---|---|---|
| 2002/0073208 A1* | 6/2002 | Wilcock | H04L 12/1818 709/227 |
| 2005/0021761 A1* | 1/2005 | Thomas | H04L 29/06027 709/227 |
| 2006/0072541 A1* | 4/2006 | Pecus | H04L 41/0896 370/351 |
| 2008/0011823 A1* | 1/2008 | Patel | G06Q 20/10 235/375 |

(Continued)

*Primary Examiner* — Cheng-Feng Huang
(74) *Attorney, Agent, or Firm* — Fogarty LLP

(57) ABSTRACT

A method performed by a communication server includes receiving a request from a first network entity to set up a communication session between a first user at a first device and a second user at a second device, wherein the first network entity is registered with the communication server, in response to the request, generating a token, wherein the token is configured to grant access to the communication session, sending the token to the first network entity, after sending the token to the first network entity, receiving the token from the first user at the first device, and causing the communication session to be set up between the first user at the first device and the second user at the second device according to the token.

20 Claims, 4 Drawing Sheets

(56) References Cited

U.S. PATENT DOCUMENTS

| | | | |
|---|---|---|---|
| 2013/0121214 A1* | 5/2013 | Ma | H04L 29/06 |
| | | | 370/259 |
| 2014/0013396 A1* | 1/2014 | Field-Eliot | H04L 63/0807 |
| | | | 726/4 |
| 2016/0072804 A1* | 3/2016 | Chien | H04W 12/08 |
| | | | 726/4 |
| 2017/0083909 A1* | 3/2017 | Mork | G06Q 20/401 |

* cited by examiner

SYSTEMS, METHODS, AND COMPUTER PROGRAM PRODUCTS FOR TOKEN-BASED SESSION SETUP IN TELECOMMUNICATION SERVICES

CROSS-REFERENCE TO RELATED APPLICATION

The present description claims priority to the commonly owned U.S. Provisional Patent Application No. 62/273,886, titled SYSTEMS, METHODS, AND COMPUTER PROGRAM PRODUCTS FOR TOKEN-BASED SESSION SETUP IN TELECOMMUNICATION SERVICES and filed Dec. 31, 2015, which is incorporated herein by reference in its entirety.

TECHNICAL FIELD

The present description relates, in general, to communication systems and, more specifically, to techniques for establishing a communication session via use of a digital token by users of communication systems.

BACKGROUND

WebRTC (Web Real Time Communication) is a project by the World Wide Web Consortium (W3C) to define a set of Application Programming Interfaces (APIs) to enable browser-to-browser and browser-to-device applications for voice, video, and text. In one example, a user at a web browser is at an e-commerce site and contemplating making a purchase. There is a link on a page of the e-commerce site that indicates that the user can talk to a representative to ask questions or place an order. The user selects the link, which includes a Uniform Resource Identifier (URI) directing the browser to a communication address of the e-commerce retailer. When the user selects the link, a WebRTC client at the user's browser sets up a call with a call center identified by the URI. The user and a customer service representative then have a call (e.g., voice, video, and/or text) via WebRTC.

In the above scenario, there is some asymmetry of information in that the user knows he is reaching out to the e-commerce retailer (or, rather, a call center subcontractor of the retailer), but the call center does not necessarily know who the user is. Such scenario is not generally undesirable for a call center because a call center may welcome calls from the public in an effort to improve the customer experiences of users. However, the call center does not want to be inundated with harassing calls or malicious calls from robots. Conventional systems do not currently offer a satisfactory techniques for permitting desired calls while minimizing unwanted calls.

BRIEF DESCRIPTION OF THE DRAWINGS

The present disclosure is best understood from the following detailed description when read with the accompanying figures.

SUMMARY

Figure 1:
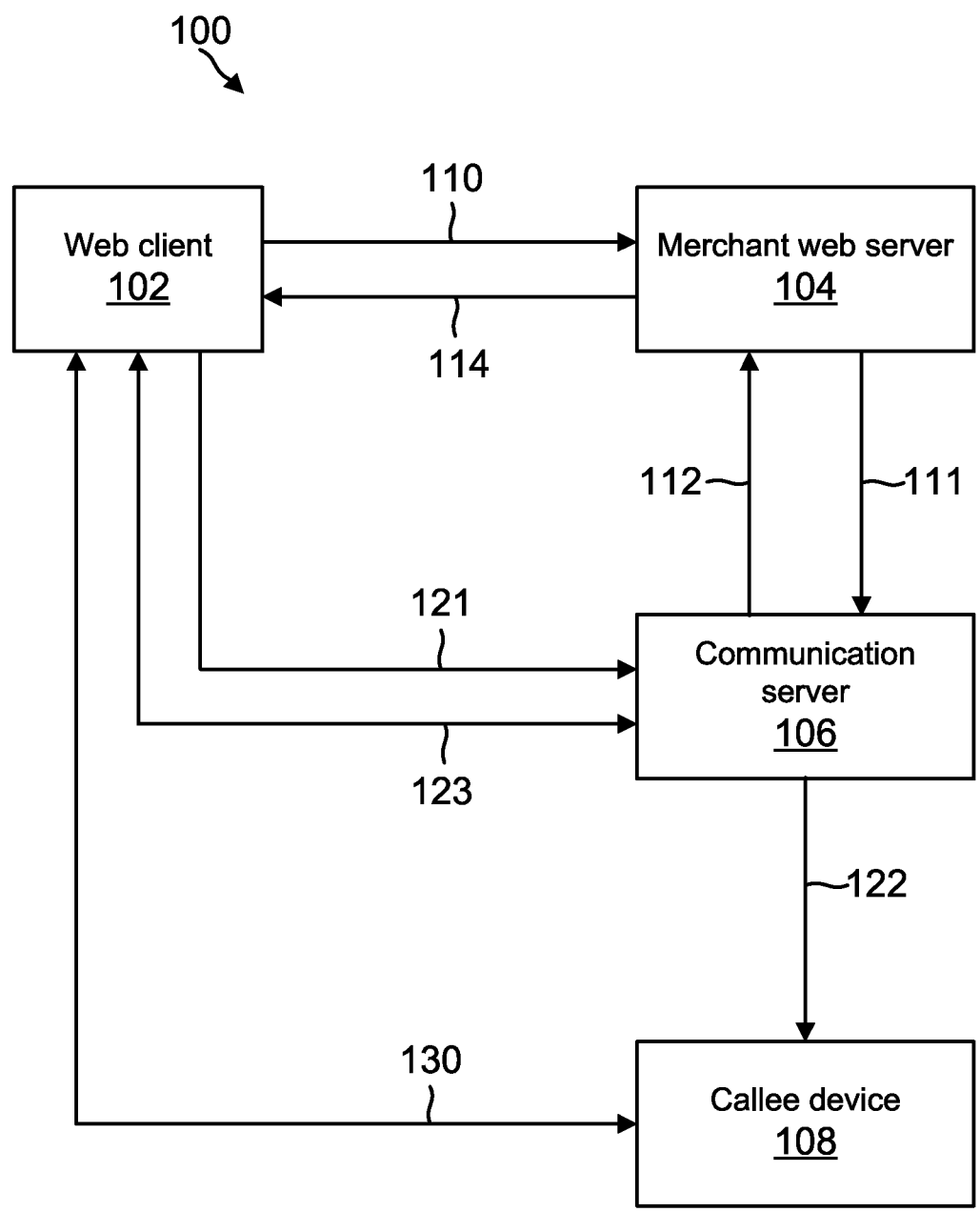
FIG. 1 illustrates an example network architecture in which embodiments may be incorporated, according to one embodiment.

According to one embodiment, method performed by a communication server includes receiving a request from a first network entity to set up a communication session between a first user at a first device and a second user at a second device, wherein the first network entity is registered with the communication server, in response to the request, generating a token, wherein the token is configured to grant access to the communication session, sending the token to the first network entity, after sending the token to the first network entity, receiving the token from the first user at the first device, and causing the communication session to be set up between the first user at the first device and the second user at the second device according to the token According to another embodiment, a system includes a network server configured to be in communication with a first network entity and a first user at a first communication device, the network server including computer-readable memory storing executable instructions thereon, and a processor configured to read and execute the executable instructions to: receive an indication from the first network entity to set up a communication session for the first user at the first communication device; in response to verifying that the first network entity has a communication account, sending a communication token to the first network entity; after sending the communication token to the first network entity, receiving the communication token from the first user at the first communication device; and establish the communication session between the first communication device and a second communication device in response to receiving the communication token from the first communication device.

According to another embodiment, a computer program product having a computer readable medium tangibly recording computer program logic for establishing a communication session between a first user at a first communication device and a second user at a second communication device, the computer program product including: code generate a communication token in response to receiving a request from a first network entity that is different from the first user and the second user, wherein the token is configured to grant access to the communication session; code to receive the communication token from the first user; code to establish the communication session between the first user and the second user in response to receiving the communication token from the first user; and code to cause the first network entity to be billed for the communication session.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The introduction of WebRTC as a communication solution allows for the creation of new usage models for communication services. One new usage model includes the ability of a web user to initiate communication with a carrier user (e.g., a landline or cellular user) or Internet phone via a web client. In this model, the guest user (web user) can simply access a URI pointing to a specific carrier communication ID (e.g., phone number, SIP user ID) to open a web client and initiate a communication session with that communication ID.

Various embodiments allow for token-based communication set up. In one example, a customer is visiting a merchant website, where the merchant website includes a link to set up a call (voice and/or video) with a customer service representative to assist the customer with questions. The customer is a web user, and is using a computer having a web browser that is WebRTC enabled. When the customer selects the link, various entities in the network set up the call on behalf of the customer. The complexities of setting up the call may be hidden from the user, and the embodiments herein provide for setting up the call using a communication token.

Continuing with the example, the customer mentioned above initiates the communication by accessing a URI received for a communication network user (e.g., via email or on the web page). Accessing the URI opens a web client via the customer's browser. The web client communicates with a web server associated with the website. The web server may or may not authenticate the legitimacy of the customer by requesting credentials (e.g., login and password) or providing a challenge-response test to prove that the customer is a human. Assuming that the customer passes the test, the web server sends a message to an Internet communication server, where the message includes a request to establish the communication session and one or more of the following pieces of information: an identity of the customer, an identity of the web server, an address of the callee, and an account number that the web server has with the communication server.

In response to the message, the communication server creates a communication token, which in one example is digital information that includes an identity of the customer, an address of the callee, and the account number. Further in this example, the communication token is encrypted so that it cannot be read or effectively modified by a party other than the communication server. In this manner, encryption keeps the destination phone number or network address secret from the customer.

The communication server passes the communication token back to the web server. The web server then passes the communication token on to the customer's web client. The web client passes the token back to the communication server. The communication server then decrypts the token and establishes the call. For instance, the communication server may use the decrypted information for the identity of the customer and the identity of the callee to facilitate a Session Initiation Protocol (SIP) call setup procedure. In some instances, the callee uses an Internet connected device, and the communication session may proceed according to VoIP procedures. In other embodiments, the callee uses a device on a Public Switched Telephone Network (PSTN), and the communication server causes a gateway to establish the portion of the call over the PSTN. As noted above, the token includes account information, and the communication server can use that account information to charge the merchant for the communication session.

Continuing with the example, the communication server inserts a timestamp into the communication token when it generates the token, and the communication server includes functionality to check timestamps for received tokens and reject communication requests using tokens with expired time stamps. An example for a lifespan of a token may be 30 seconds, so that when the communication server checks the timestamp it compares it to the threshold of 30 seconds and accepts or rejects the request based on whether the timestamp falls within or exceeds the threshold. Of course, 30 seconds is only an example, and other embodiments may use any acceptable threshold. In this manner, timestamps provide a way to enforce single use of a communication token. Accordingly, should the customer terminate the request and attempt to reestablish another communication session with the callee, the customer would get another communication token rather than using the old token.

Various embodiments may include advantages over conventional solutions. For instance, some embodiments provide a way to allow for anonymous guest users, such as customers to a website who do not have an established account, without allowing for malicious or excessive calling.

The scope of embodiments is not limited to any particular type of communication. For instance, various embodiments may be applied to voice communication, instant messaging, multimedia video conferences, file sharing, and the like. Further, while the examples below focus on a Session Initiation Protocol (SIP) embodiment, any appropriate communication protocol can be used in various embodiments. Moreover, the examples below assume use of WebRTC as the communication protocol; however, the scope of embodiments can be applied to any communication protocol that allows a user to initiate real-time communication with another user with a digital token. For example, a browser or web-enabled application can be extended via media handling plugins, get access to media input/output on the device running the browser and transport it over any type of bearer, as long as the other end of the call has a compatible implementation.

FIG. 1 illustrates an example network architecture 100 in which embodiments may be incorporated. The network architecture 100 includes web client 102 running on a network device that is associated with the customer in this example. The network device (not shown) may include any appropriate type of device, such as a laptop computer, desktop computer, smartphone, tablet, or the like. In this example, the network device runs a web browser that includes WebRTC functionality in client 102.

Web client 102 communicates over a network with merchant web server 104. In one example, web client 102 and merchant web server 104 communicate over the Internet, and it is understood that various embodiments may communicate across any appropriate network. For example, web client 102 may communicate via a Local Area Network (LAN), Wide Area Network (WAN), cellular network, or other network to reach web server 104 (and communication server 106 as well as callee device 108).

Merchant web server 104 in this example is a server that is associated with a website of the merchant, and it provides a webpage interface in which a link is provided to the user (customer) at the web client 102. The user may request a communication session with a customer service representative by selecting the link. Communication server 106 is in communication with web client 102, callee device 108, and merchant web server 104. Communication server 106 provides communication between web client 102 (on a first network) and callee device 108 (on the first network or another network). In the example of FIG. 1, communication server 106 includes application programming interfaces (APIs) that can communicate with both web client 102 and callee device 108, thereby allowing voice, data, and messages to traverse the disparate networks if appropriate.

Communication server 106 can be used to provide services to multiple callees which can be all in the same network or in different networks (i.e., communication server 106 is configured to communicate with multiple endpoints devices).

The various servers 104, 106 of FIG. 1 are shown as single boxes for ease of illustration herein. However, the concept of a server in FIG. 1 may include more than one server, so for instance, merchant web server 104 may represent a single server computer or multiple server computers working together to provide a web-based e-commerce experience. The same is true for communication server 106—a single box can represent one or more servers. Various embodiments may include any appropriate hardware to act as a server, such as a general purpose computer running an operating system such as Linux. Device 108 is a device used by the callee to communicate over a communication network. Examples of devices that can be used as callee device 108 include a phone, laptop computer, a smartphone, a desktop computer, a tablet, and the like.

Communication server 106 may be disposed at a private enterprise network, a LAN, or a carrier network (e.g., the PSTN or a cellular network). In some examples, communication server 106 acts a gateway for the callee device 108 by receiving communication over the first network (e.g., an Internet Protocol—IP—network) and converting signaling and data to conform to the carrier's network. Communication server 106 sets up the communication session and maintains a communication session, as described in more detail with respect to FIG. 2.

One example use case starts out with a customer clicking on (or otherwise selecting) a URI that links to merchant web server 104 and is intended to initiate a call to the callee, which in this example may include one or more communication devices at a call center. The communication among the various devices of FIG. 1 in this example is performed according to HTTP, except for the SIP messages described below. Also, once communication is set up, voice and video may be sent using, e.g., Real-time Transport Protocol (RTP) or other protocol. File sharing may be performed using, e.g., File Transport Protocol (FTP) or other protocol.

Message 110 is a communication to server 104 established by the customer selecting the link. Message 110 may include, for example, digital data indicating a network address (e.g., IP address) of the customer's web client 102, an identity of the customer (e.g., a name or web login) or other information. Server 104 recognizes message 110 as an attempt to establish a call to the call center, and server 104 sends message 111 communication server 106 to request that the communication session be established between web client 102 and callee device 108. Message 111 may include any appropriate digital information, and in this example includes an identity of the customer, and identity of the merchant associated with web server 104, a destination network address (e.g., an IP address of the callee device 108 or a destination telephone number), and an account number associated with the merchant.

Merchant web server 104 in this example knows the destination telephone number, as the merchant is the party who assigns the particular customer service representative. Merchant web server 104 also has an identity and an account number that it uses when it interfaces with communication server 106. Specifically, the merchant and a communication service provider have a contractual relationship, where the communication service provider provides the merchant with the ability to connect its customers with customer service representatives. Communication server 106 is associated with and registered with the communication service provider, and the communication service provider bills the merchant for use of its services. Merchant web server 104 inserts the customer's identifying information, the merchant's identifying information, the destination network address, and the account number into message 111.

Communication server 106 receives message 111 and generates a communication token from the information in message 111. In the example of FIG. 1, the communication server 106 creates one or more pieces of digital information, including the customer's identifying information, the merchant's identifying information, the destination network address, and the account number. Communication server 106 then encrypts the information.

The token may be generated in any of a variety of ways. For instance, the token may be encrypted using a secret that is shared between the merchant web server 104 and the communication server 106. Alternatively, the communication server 106 may encrypt the token using a secret known only by the communication server 106 itself. Furthermore, while this example refers to a token, it is understood that the information may be broken up into two or more tokens. For instance, the destination phone number and the account number may each be placed in separate tokens, and those tokens may be encrypted using the same or a different secret. The scope of embodiments may use any appropriate encryption technology, such as a public-key encryption technology (e.g., Pretty Good Privacy—PGP), or other technologies.

In the above example, the token itself includes identifying information for the customer, the merchant, the merchant's account, and has the destination phone number. In another example embodiment, such information is omitted from the token itself, and the token includes a key, which communication server 106 can use to look up the information. In such an embodiment, generating the token may include the communication server 106 using a database entry or other file structure to associate a particular alphanumeric key with the identifying information for the customer, the merchant, the merchant's account, and the destination phone number. In an embodiment in which the token itself omits the information it includes an alphanumeric key, the communication server 106 may or may not encrypt the token.

Moreover, the token may include a timestamp from the communication server 106. Various embodiments may generate the token in any appropriate manner, as long as the token may be used to establish a requested communication session between web client 102 and callee device 108.

Communication server 106 sends message 112 to merchant web server 104, where message 112 includes the token. Message 112 may also identify the request from the merchant and/or the web client 102 so that the merchant web server 104 may pass the token on to web client 102. Web server 104 receives the token in message 112 and then passes the token to web client 102 using message 114. Message 114 in this example may further provide a network address for the communication server 106 and an instruction to the web client 102 to communicate with communication server 106.

Web client 102 receives the token in message 114, and in response to message 114 sends message 121 to communication server 106. Message 121 includes the token. Therefore in this example the communication server 106 generates the token but does not pass the token directly to the web client 102. Rather, communication server 106 leaves it to the merchant web server 104 to pass the token to web client 102. Also, the web client 102 does not have access to the destination address, and instead, relies on the token to set up the communication session.

Communication server 106 receives message 121 from web client 102, including the token. Communication server 106 then decrypts the token to retrieve the information therein. Communication server 106 decrypts the token using appropriate decryption procedures. Communication server 106 compares the decrypted timestamp to a current time and a threshold. If the timestamp is older than the threshold allows, then communication server 106 rejects the request. On the other hand, if the timestamp fits within the threshold, then communication server 106 may continue by sending messages 122, 123. In the present example, the tokens are intended to be single use only, so that comparing the timestamps to a threshold forces an expiration upon the request for the communication session. If a token is presented after the threshold time, communication server 106 is programmed to deny the communication request, thereby ensuring that tokens are not reused maliciously. Various embodiments may use any appropriate time threshold, such as 30 seconds or other time window in which it is reasonable to assume that the time including messages 112 and 121 would elapse, but not long enough to allow the token to be disseminated widely among unintended recipients.

Messages 122 and 123 are signaling messages to establish the communication session. For instance, messages 122 and 123 may include SIP invite messages and other SIP signals to establish the communication session. The human user at callee device 108 accepts the call, and the acceptance of the call is indicated to server by messages 122. Server 106 then sets up the call via message 123 to web client 102. Web client 102 and callee device 108 then exchange voice media at message 130 using, e.g., RTP or other appropriate protocol.

The embodiments of FIG. 1 are examples, and different embodiments may include different scenarios. For instance, other embodiments may include the callee device 108 at a landline phone or a smartphone on a cellular network. In such an instance, communication server 106 may use a gateway (not shown) or other appropriate device to set up the leg of the call over a PSTN or other network to callee device 108. In other embodiments, communication between the communication server 106 and web client 102 and callee device 108 may not use SIP but instead may use some other protocol such as H.248 or XMPP, as appropriate for the particular network.

Figure 2:
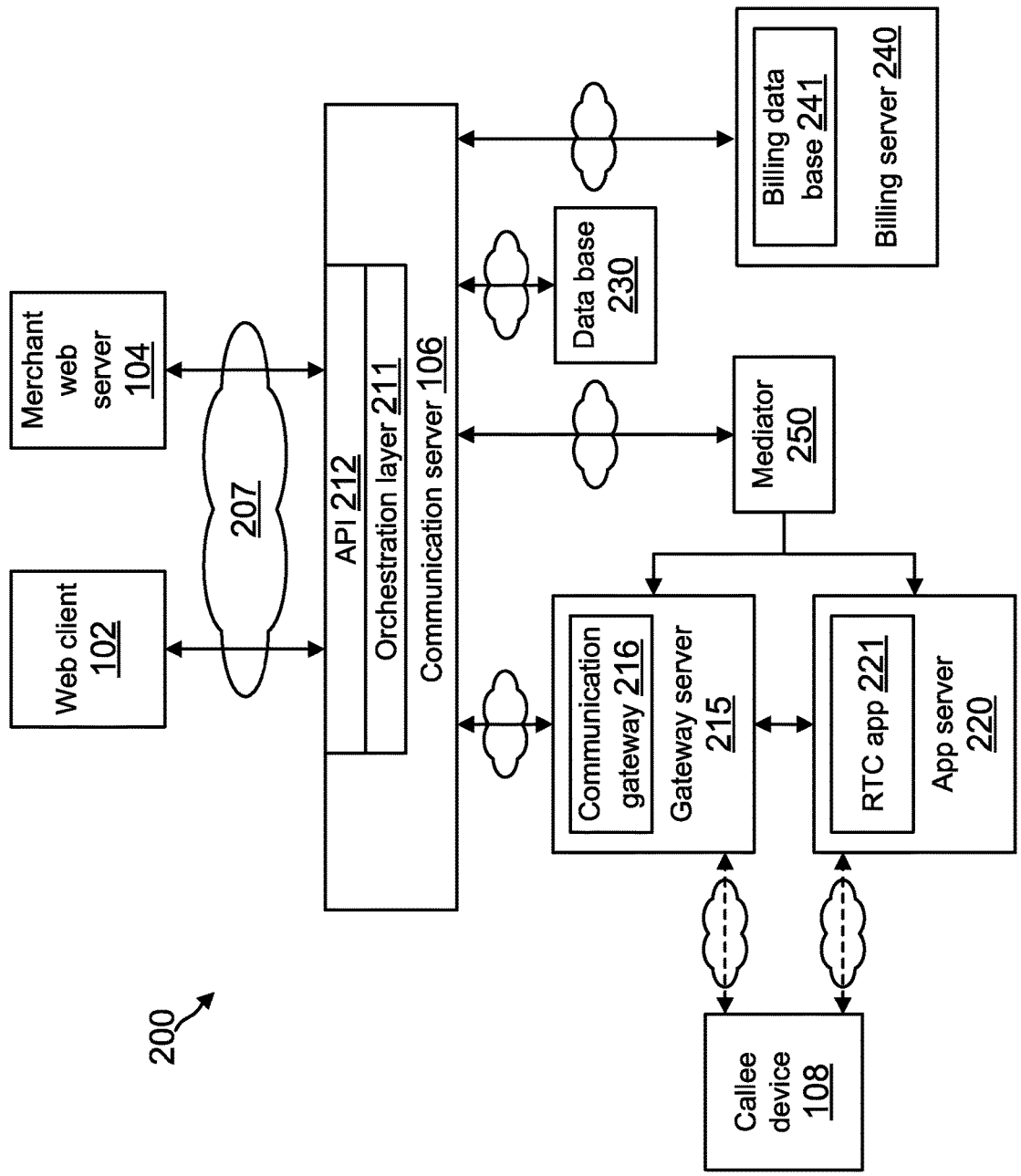
FIG. 2 illustrates an example network architecture in which embodiments may be incorporated, according to one embodiment.

FIG. 2 illustrates a block diagram of the system architecture 200 in which the embodiments of the present disclosure may be incorporated. Specifically, FIG. 2 provides a more detailed view of a specific example embodiment in which to implement to the principles of system 100 (FIG. 1). The system architecture 200 includes web client 102 and merchant server 104, both of which interface with an orchestration layer 211 included in the communication server 106 using, for example, the Internet 207. In various embodiments, the web client 102 and merchant server 104 interface with the orchestration layer 211 through a custom application programming interface (API) 212 included within the orchestration layer 211. In turn, the orchestration layer 211 interfaces with a communication gateway 216 included in a gateway server 215, a real-time communication (RTC) application 221 included in an application server 220, a system database 230, and a billing server 240 including a billing database 241. In various embodiments, the orchestration layer 211 may interface with the communication gateway 216 and the RTC application 221 through a mediator 250. Also, the orchestration layer 211 may interface with the billing server 240 directly or through the system database 230.

The gateway server 215, the application server 220, and the system database 230 may be included within a single server or separate servers. The concept of a server in FIG. 2 may include more than one server. Various embodiments may include any appropriate hardware to act as a server, such as a general purpose computer running an operating system such as Linux. Although network 207 is shown as the Internet, it is understood that various embodiments may communicate across any appropriate network. For example, web client 102 and merchant server 104 may interface with the orchestration layer 211 through a Local Area Network (LAN), Wide Area Network (WAN), cellular network, or any other network.

The orchestration layer 211 manages, monitors, and maintains various applications and services. The orchestration layer 211 includes the API 212 to receive commands and messages from the web client 102 and merchant server 104 and relays the received commands and messages to the proper applications for processing. The orchestration layer 211 provides unified access to the applications and services of the communication gateway 216, the RTC application 221, the database 230, and the billing server 240 for the convenience of the user.

The present disclosure allows merchant server 104 to interface with the orchestration layer 211 upon registration with the communication server 106. In various embodiments, merchant server 104 may register with the communication server 106 by using a web portal to access the registration webpage of the communication server 106. The orchestration layer 211 enables storing of registration information of the merchant in a domain in the database 230. Registration information may also be stored in separate domains in the gateway server 215 and/or the application server 220. Registration information of the merchant may include information of the merchant such as name, IP address, web domain, billing account number, account details (e.g., number of minutes in account), and the like. In this way, the merchant server 104 is associated with an account.

The merchant may register as a user of the communication server 106, and allow its customers (e.g., a customer at web client 102) to conduct real-time communication sessions with merchant representatives. For instance, the merchant may provide a URL link on a user application being used by client 102. By clicking on the URL link, the client 102 may conduct a real-time communication session with a merchant representative at callee device 108 (e.g., at a call center). The client 102 may select the link via user input and may be able to access the services associated with the communication server 106 through the registered account of the merchant. In this example, the client 102 selects the link and is able to conduct a real-time communication session with the merchant representative at callee device 108 for the purpose of receiving customer service from the merchant. In this case, even though the client 102 is the calling party and the callee 108 is the destination party, the communication server 106 bills or charges the account of the merchant, who is the registered user. In other words, the merchant pays for the above communication session between the client 102 and the merchant representative at callee device 108 as part of providing customer service.

In this example, web client 102 includes the capability to carry out inbound and outbound voice-over-IP (VOIP) communication session and calling to the public switched telephone network (PSTN), instant messaging, file sharing, and video communication session. The web client 102 interfaces with the orchestration layer 211 through the API 212 included within the orchestration layer 211. The credentials provided to the web client 102 in this example include the communication token.

Upon receiving the communication token, the orchestration layer 211 coordinates with the communication gateway 216 to allow the web client 102 to access the applications and services integrated by the orchestration layer 211. For example, when the web client 102 attempts to conduct a communication session with a destination party, the web client 102 provides the destination information (e.g., destination party's name, telephone number, IP address, etc.) to the orchestration layer 211 via the token.

The communication gateway 216 allows the web client 104 access to a plurality of services. For example, the communication gateway 216 may authenticate the web client 104 as a guest user that is using credits belonging to the merchant to conduct the communication session. Before establishing the communication session, the communication gateway 216 may determine an identity of the merchant and an account number of the merchant from the token. In various embodiments, the communication gateway 216 coordinates with the orchestration layer 211 and the database 230 to compare the merchant name and account number with the registration information of the users stored in the database 230. The communication gateway 216 may authenticate the user at client 102 as a guest user with sufficient credits to conduct the communication session upon finding a match for the merchant's account in the database 230. Of course, the communication gateway 216 may use any appropriate information for authentication purposes. Upon successful authentication, the orchestration layer 211 coordinates with the communication gateway 216, the RTC application 220, the database 230, and the billing server 240 to allow the guest user at client 102 to conduct the communication session.

In various embodiments, as shown in FIG. 2, the orchestration layer 211 interfaces with the web client 102 and merchant server 104 through the API 212. That is, the web client 102 and merchant server 104 call functions of the API 212 to inform the orchestration layer 211 that the user at client 102 wishes to conduct a communication session with a destination party and/or to request a token. In various embodiments, the web client 102 identifies the callee device 108 via an HTTP/HTTPS request to communication server 106, where the request includes the token. The application program interface 212 receives the HTTP/HTTPS request from the client 102 via the network 107. The application program interface 212 may be configured to accept the HTTP/HTTPS request in several different formats, such as XML, JSON, and URL-Encoded (GET/POST).

The communication gateway 216 receives the destination information from the orchestration layer 216. The communication server 106, the communication gateway 216, the RTC application 221, and the orchestration layer 211 coordinate to set up the communication session and send or push a notification to the callee device 108. For example, the communication gateway 216 or the orchestration layer 211 may coordinate with the RTC application 221 to set up the communication session. Further, the orchestration layer 211 may send or push a notification to callee device 108. The pushed notification from the orchestration layer 211 may inform the destination party that the guest user wishes to conduct a web communication session with the destination party. If the destination party accepts the communication session via the callee device 108, then the orchestration layer 211 provides the necessary signaling (e.g., SIP) for the RTC application 221 to set up the communication session. In this way, the communication gateway 216, the orchestration layer 211, and the RTC application 221 coordinate with each other to conduct a web communication session (audio and/or video) between the guest user's web client 102 and the destination party at callee device 108.

The orchestration layer 211 may further coordinate with the billing server 240 to determine and bill the charges incurred for the web communication sessions to the merchant's account. In various embodiments, the orchestration layer 211 may enable the monitoring of duration of the communication session, and coordinate with the billing server 240 to bill/charge the merchant for the communication session. The coordination with the billing server 240 may include deducting a number of credits required for the above communication session from the number of credits previously purchased by the merchant.

The communication gateway 216 may also allow the guest user to conduct communication sessions with the destination party over a plurality of different networks. For example, the communication gateway 216 may coordinate with the orchestration layer 211 and the RTC application 221 to set up a public switched telephone network (PSTN) phone call to the destination party. That is, the communication gateway 216 may coordinate to set up an IP to PSTN call between the guest user at web client 102 and the destination party at callee device 108 if the callee device 108 is on the PSTN. This IP to PSTN call may include a portion of the call being conducted over the IP network and another portion over the PSTN network.

In various embodiments, the communication gateway 216 requests the RTC application 221 to set up the IP to PSTN call by providing the RTC application 221 with identifying information (e.g., IP address) of the guest user and destination information (e.g., telephone number) of the destination party. The RTC application 221 may use address translation to translate the IP address of the authenticated user into a telephone number and then use the translated telephone number to place the call the destination party over the PSTN network. For example, to place the call, the RTC application 221 may provide the translated telephone number of the guest user and the telephone number of the destination party to a PSTN provider. Upon acceptance of the call by the destination party, the IP to PSTN call is set up and the authenticated user and the destination party may communicate.

During the communication, data may be received by the orchestration layer 211 in the form of digital IP packets from the web client 102 user over the IP network 107. In this case, the RTC application 211 receives and processes the digital IP packets into a digital signal, and then converts the digital signal into an analog signal to be sent to the PSTN provider for communication over the PSTN network. Also, data may be received by the RTC application 221 (through the PSTN provider) in the form of an analog voice signal from the callee device 108 over the PSTN network. In this case, the RTC application 221 may convert the analog voice signal into a digital voice signal, and then use a codec to process the distal voice signal to produce digital IP packets to be sent to the guest user over the IP network 107.

In this way, the orchestration layer 211, the communication gateway 216, and the RTC application 221 may coordinate the processing and the signaling required to conduct the above IP to PSTN call. As such, the orchestration layer 211, the communication gateway 216, and the RTC application 221 together act as a bridge between the web client 102 using the Internet protocol to call the telephone number of the callee device 108 over the PSTN network. The orchestration layer 211 may further coordinate with the billing server 240 to determine and bill the charges incurred for the IP to PSTN call to the merchant's account. To conduct the above communication sessions, the components 211, 216, 221 may use one or more signaling protocols, such as SIP or other protocol in the IP leg of the call. Once the communication session has been set up, audio and video communication may be enabled as discussed above by using, for example, Real-time Transport Protocol (RTP) or other protocol for the IP leg of the call. File sharing over IP may be performed using, for example, File Transport Protocol (FTP) or other protocol.

The communication gateway 216 and the RTC application 221 may communicate with other components of the system by using their respective protocols and interfaces. For instance, the communication gateway 216 may use a Symbol Object Access Protocol (SOAP) based protocol such as Web Services Management (WSMAN), and the RTC application 221 may use the Subscriber Open Programmability Interface (SOPI). In this case, the orchestration layer 211 may communicate with the communication gateway 215 and the RTC application 221 through a mediator 250. The orchestration layer 211 may provide the mediator 250 with the information, which may be appropriately converted by the mediator 250 for communication with the communication gateway 215 or the RTC application 221, and vice versa.

Figure 3:
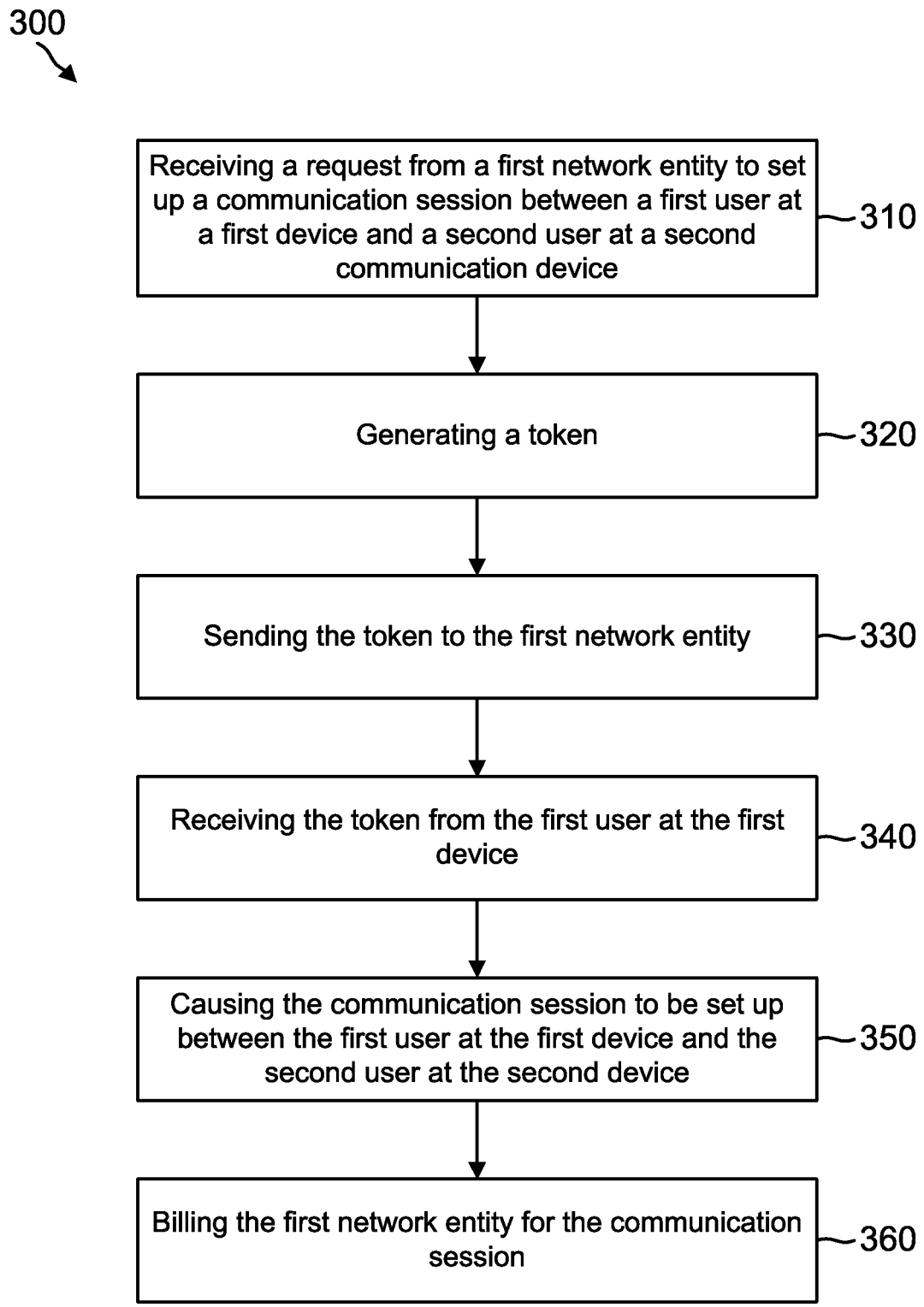
FIG. 3 is a simplified block diagram of an example method, adapted according to one embodiment.

FIG. 3 is a simplified block diagram of method 300, adapted according to one embodiment. Method 300 may be performed by a computer, such as communication server 106 of FIGS. 1 and 2. For instance, a computer may read executable code from a non-transitory medium and then execute the code to perform the actions described below.

At action 310, the communication server receives a request from a first network entity to set up a communication session between a first user at a first communication device and a second user at a second communication device. The first and second communication devices may be on different networks, as described above with respect to FIG. 2, where one network may include an IP-based network and the other network where the callee resides is a carrier-owned network, such as a PSTN. Additionally or alternatively, the first and second communication devices may both be on one or more IP networks. Also, the first and second devices may be different types of devices (laptop computers, VOIP-enabled phones, smartphones, etc.). In the example of FIG. 1, the first device would include a computing device running a browser that includes web client 102.

In one embodiment, action 310 includes, among other things, the first user selecting a link that includes a URI directed to the network entity or the second user. However, the scope of embodiments includes other techniques wherein the first user may initiate communication by, e.g., selecting an address from a directory, rather than selecting a link.

Furthermore, in this example, the network entity may include a website, a web server providing access to the website, or some other device or feature on a network. In the example of FIG. 1, the network entity includes a web server associated with a merchant, although the scope of embodiments is not limited to a website or a merchant. Also, while the examples of FIGS. 1 and 2 are directed toward a merchant/customer relationship, the scope of embodiments includes any kind of relationship between the calling party, the network entity, and the callee party. In the example of FIGS. 1 and 2, the network entity is associated with a communication account, specifically, a billing account for the merchant. In other words, the network entity is already registered with the communication server to receive communication services.

At action 320, the communication server generates a token. Examples are discussed above with respect to FIG. 1, where the token may be generated in any appropriate manner. In one example, the token is an encrypted piece of digital information that includes an identifier of the user, an identifier of the network entity, a destination network address, and an account number of the network entity. In another example, the token includes an alphanumeric string that does not directly provide the information mentioned above, but rather, may be used by the communication server as a key to find an entry that does include such information. In another example, a single token may be broken up into two or more tokens, and the two or more tokens may be encrypted the same way or a different way. Additionally, some embodiments include providing a timestamp in the token.

At action 330, the communication server sends the token to the first network entity. In one example, the communication server sends the token to the same or different web server that hosts the website which provided the link to the calling party.

At action 340, the communication server receives the token from the first user at the first communication device. Action 340 may also include in some embodiments decrypting the token (if appropriate) and using the information from the token to determine the calling party, the destination network address, and a billing account used to pay for the communication session. Alternatively, the communication server may use the token to locate information identifying the callee and the communication account. Furthermore, action 340 may include comparing a timestamp in the received token to a current time and then comparing that result to a threshold to verify whether the token has expired. For instance, if the timestamp compared to a current time is more than the threshold, the communication server may deny the communication request. On the other hand, if the timestamp compared to a current time is less than a threshold, then the communication server may move to action 350. As noted above, any appropriate threshold may be used in various embodiments.

At action 350, the communication server causes the communication session to be set up between the first user at the first communication device and the second user at the second communication device. An example of action 350 is given above with respect to FIG. 2, where the orchestration layer 211 interfaces with the gateway server 215 and/or the application server 220 to complete the communication session with the callee device 108 over a PSTN or another network, depending on the location of the callee device 108. For example, if the callee device 108 is located on an IP network, then application server 220 may use RTC application 221 to provide a real time communication session with the callee device according to VoIP procedures. On the other hand, if the callee device 108 is located on a PSTN, then orchestration layer 211 may interface with communication gateway 216 to establish a leg of the call over a PSTN to callee device 108.

It should be noted that the disclosure is not limited to the specific embodiments shown above. For instance, other embodiments may include a communication session of any type, such as messaging, voice, video, file sharing, and the like.

Furthermore, other embodiments may include techniques wherein the web server 104 (FIG. 1) generates the token, rather than the communication server 106 generating the token. In such an embodiment, the web server 104 registers with the communication server 106, and the communication server 106 provides the token-generating algorithm to web server 104. Continuing with this example, when the web client 102 requests a communication session, the web server 104 generates the token and sends the token to the web client 102 with instructions to provide the token to the communication server 106. In response to receiving the token and the instructions, the web client 102 sends the token to the communication server 106. The communication server 106 then sets up the call as it would in the example of FIG. 1.

Furthermore, various embodiments may implement other measures to reduce or eliminate the presence of malicious robots taking advantage of the calling resources. For example, in some embodiments, the web server 106 provides a challenge-response test to the user at a web client 102. An example of a challenge-response test includes the one marketed under the mark CAPTCHA™, and it can be used in an attempt to verify that the user is a human user rather than a machine. In some examples, web server 104 requests a token from communication server 106 only if the user at a web client 102 successfully passes the challenge-response test. Of course, any appropriate technique to reduce the number of unwanted or malicious activity on the system may be used in various embodiments.

Various embodiments may include one or more advantages over conventional systems. For instance, conventional systems using WebRTC may have difficulty authenticating users and may also have difficulty preventing abuse by anonymous users. By contrast, various embodiments above provide for a token that is intended for a single use, or at most a few uses during a short time threshold, thereby preventing repeated abuses by dissemination of the token or reuse of the token. Furthermore, various embodiments described herein provide a technique for an owner of a website to allow visitors to the website to request communication sessions with the designated call centers, while allowing a user some amount of anonymity and allowing the website owner protection against abusive use.

Figure 4:
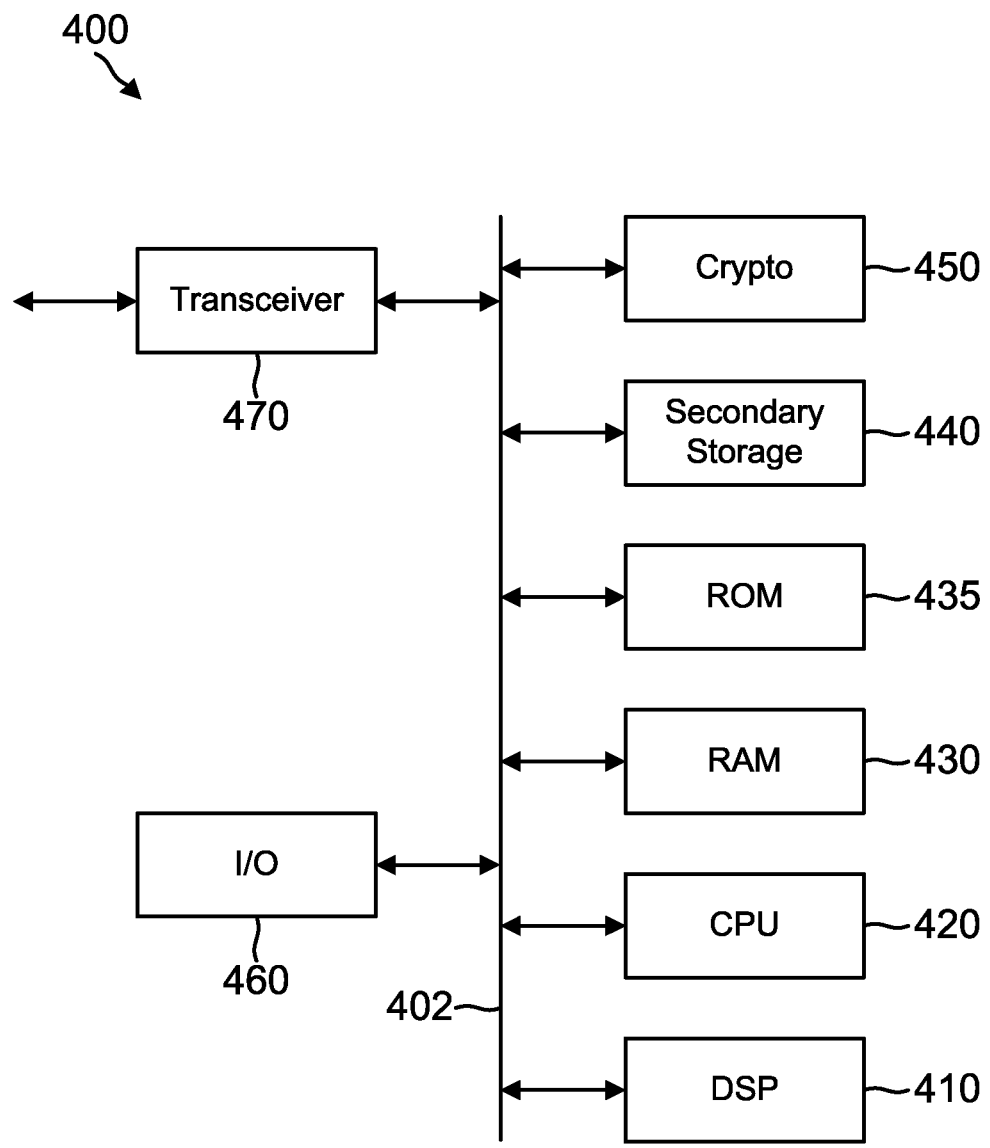
FIG. 4 illustrates an example computer system, adapted according to one embodiment.

FIG. 4 illustrates an example computer system 400 adapted according to one embodiment of the present disclosure. The computer system 400 includes an example system on which embodiments of the present disclosure may be implemented (such as the various servers of FIGS. 1 and 2, as well as the user device on which web client 102 executes and the callee device 108). The computer system 400 includes a digital signal processor (DSP) 410, a central processing unit (CPU), a random access memory (RAM) 430, a read-only memory (ROM) 435, secondary storage 440, encryption and decryption resources 450, input/output (I/O) devices 460, and a of transceivers 470, all of which may be communicatively coupled via a bus 402.

The CPU 420 may be implemented using hardware or a combination of hardware and software. Although illustrated as a single CPU, the CPU 420 is not so limited and may comprise multiple processors. The CPU 420 may be implemented as one or more processors, i.e., as one or more chips, cores (e.g., a multi-core processor), field-programmable gate arrays (FPGAs), and/or application specific integrated circuits (ASICs). Likewise, the DSP 410 may be implemented as more than one DSP chip. The DSP 410 may perform transcoding or transrating of a media stream or call flow received by a transceiver 470. Crypto resources 450 may include a hardware accelerator for performing security features such as encryption or authentication of a media stream or call flow received by transceiver 470.

The secondary storage 440 may comprise one or more disk drives or solid state drives and is used for non-volatile storage of data and as an over-flow data storage device if the RAM 430 is not large enough to hold all working data. The RAM 430 may be static RAM, dynamic RAM, or the like, and the ROM 435 may be programmable ROM (PROM), erasable PROM (EPROM), electrically EPROM (EEPROM), or the like. The secondary storage 440 may be used to store programs that are loaded into the RAM 430 when such programs are selected for execution. The ROM 435 is used to store instructions and perhaps data that are read during program execution. The ROM 435 is a non-volatile memory device that typically has a small memory capacity relative to the larger memory capacity of the secondary storage. The RAM 430 is used to store volatile data and perhaps to store instructions. Access to both the ROM 435 and the RAM 430 is typically faster than to the secondary storage 440.

The computer system 400 includes transceivers 470. There may be a transceiver 470 for each communication line (e.g., electrical or optical) coupled to the computer system 470. A transceiver 470 may be bidirectional or unidirectional, depending on the embodiment. Each transceiver 470 is adapted to couple computer system 400 to a communication link (e.g., a wired or wireless communication link). In the examples of FIGS. 1 and 2, transceivers 470 may couple a respective device to a network such as the Internet or a PSTN.

The I/O devices 460 may include a keyboard, a computer mouse, a microphone, and/or a display device for allowing a user to provide input to and receive output from the computer system 400.

It is understood that by programming and/or loading executable instructions onto the computer system 400, at least one of the CPU 420, the RAM 430, and/or the secondary storage 440 are changed, transforming the computer system 400 in part into a particular machine or apparatus having the functionality taught by the present disclosure. The executable instructions may be stored on the RAM 430 or secondary storage 440 and loaded into the CPU 420 for execution. The device functionality described above with respect to FIGS. 1-3 may be implemented as a software application running on the CPU 420 and using the RAM 430, the ROM 435, and/or secondary storage 440. Specifically, for communication server 106, its functions described at FIG. 3 may be implemented as a software application running on the CPU 420.

Logic may be encoded in a non-transitory computer-readable medium, such as RAM 430 and/or secondary storage 440. Such a medium can take many forms, including but not limited to, non-volatile media and volatile media. In various implementations, non-volatile media includes optical or magnetic disks, such as secondary storage 440, and volatile media includes dynamic memory, such as various types of RAM 430. CPU 420 reads application code from the readable medium and executes the code to provide the described functionality.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method performed by a communication server comprising:
   receiving a request from a first network entity to set up a communication session between a first user at a first device and a second user at a second device, wherein the first network entity is registered with the communication server;
   in response to the request, generating a token, wherein the token is configured to grant access to the communication session;
   sending the token to the first network entity;
   after sending the token to the first network entity, receiving the token from the first user at the first device; and
   causing the communication session to be set up between the first user at the first device and the second user at the second device according to the token, wherein a destination address of the second device is kept secret from the first user.

2. The method of claim 1, wherein the token includes encrypted information comprising:
   an identifier of the first user, an identifier of the first network entity, an identifier of the second user, and an identifier of a communication account.

3. The method of claim 2, wherein each of the identifier of the first user, the identifier of the second user, and the identifier of the communication account are separately encrypted.

4. The method of claim 1, wherein receiving the token from the first user comprises:
   decrypting the token and using decrypted information from the token to identify the second user and the communication account.

5. The method of claim 1, wherein the token comprises an alphanumeric string that does not identify the second user or the communication account, further wherein the method comprises:
   after receiving the token from the first user at the first device, using the token to locate information identifying the second user and the communication account.

6. The method of claim 1, wherein the first network entity comprises a web server providing an interactive webpage by which the first user request the communication session.

7. The method of claim 1, further comprising:
   verifying that a timestamp of the token has not expired before causing the communication session to be set up.

8. The method of claim 1, wherein the first network entity and the first user communicate using Hypertext Transfer Protocol (HTTP).

9. The method of claim 1, wherein causing the communication session to be set up comprises:
   using Session Initiation Protocol (SIP) signaling to set up the communication session.

10. The method of claim 1, wherein causing the communication session to be set up comprises:
    instructing a gateway to establish communication with the second user over a Public Switched Telephone Network (PSTN).

11. A system comprising:
    a network server configured to be in communication with a first network entity and a first user at a first communication device, the network server having:
    computer-readable memory storing executable instructions thereon; and
    a processor configured to read and execute the executable instructions to:
    receive an indication from the first network entity to set up a communication session for the first user at the first communication device;
    in response to verifying that the first network entity has a communication account, sending a communication token to the first network entity;
    after sending the communication token to the first network entity, receiving the communication token from the first user at the first communication device; and
    establish the communication session between the first communication device and a second communication device in response to receiving the communication token from the first communication device, wherein a destination address of the second communication device is kept secret from the first user.

12. The system of claim 11, wherein the communication account provides for a prepaid the number of minutes of communication sessions.

13. The system of claim 11, wherein the processor is further configured to:
    verify that a timestamp of the communication token has not expired before causing the communication session to be set up.

14. The system of claim 11, wherein the communication token is encrypted information comprising:
    an identifier of the first user, an identifier of the first network entity, an identifier of a second user associated with the second communication device, and an identifier of the communication account.

15. The system of claim 11, wherein the communication token comprises an alphanumeric string that does not identify the second communication device or the communication account, further wherein the system is further to:
    after receiving the communication token from the first user, use the communication token to locate information identifying the second communication device and the communication account.

16. A computer program product having a non-transitory computer readable medium tangibly recording computer program logic for establishing a communication session between a first user at a first communication device and a second user at a second communication device, the computer program product comprising:
    code generate a communication token in response to receiving a request from a first network entity that is different from the first user and the second user, wherein the communication token is configured to grant access to the communication session;
    code to receive the communication token from the first user;
    code to establish the communication session between the first user and the second user in response to receiving the communication token from the first user, wherein a destination address of the second communication device is kept secret from the first user; and
    code to cause the first network entity to be billed for the communication session.

17. The computer program product of claim 16, wherein the communication session comprises at least one of:
    text media;
    video media; and
    voice media.

18. The computer program product of claim 16, further comprising:

code to pass the communication token to the first network entity before receiving the communication token from the first user.

19. The computer program product of claim 16, wherein the code to establish the communication session comprises:
   code to instruct a gateway to establish communication with the second user over a Public Switched Telephone Network (PSTN).

20. The computer program product of claim 16, wherein the communication token is encrypted information comprising:
   an identifier of the first user, an identifier of the first network entity, an identifier of the second user, and an identifier of a communication account.

\* \* \* \* \*